(12) United States Patent
Nagata et al.

(10) Patent No.: US 8,115,442 B2
(45) Date of Patent: Feb. 14, 2012

(54) ELECTRIC MOTOR DRIVE SYSTEM AND ELECTRIC MOTOR CONTROL METHOD

(75) Inventors: Koichiro Nagata, Mito (JP); Toshio Katayama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 12/359,454

(22) Filed: Jan. 26, 2009

(65) Prior Publication Data
US 2009/0195200 A1 Aug. 6, 2009

(30) Foreign Application Priority Data
Jan. 31, 2008 (JP) ................................. 2008-020920

(51) Int. Cl.
*H02P 1/24* (2006.01)
(52) U.S. Cl. ..................... 318/727; 318/400.32; 318/800
(58) Field of Classification Search .................. 318/727, 318/400.32, 800, 805, 811, 803, 807, 809, 318/400.23, 400.04, 801, 723
See application file for complete search history.

(56) References Cited

U.S. PATENT DOCUMENTS

| | | | | |
|---|---|---|---|---|
| 4,926,105 A | * | 5/1990 | Mischenko et al. | .......... 318/800 |
| 2005/0269983 A1 | * | 12/2005 | Takai et al. | .................... 318/432 |
| 2007/0159130 A1 | * | 7/2007 | Kaneko et al. | ................. 318/806 |

FOREIGN PATENT DOCUMENTS

JP   06-346157   12/1994

* cited by examiner

*Primary Examiner* — Karen Masih
(74) *Attorney, Agent, or Firm* — Antonelli, Terry, Stout & Kraus, LLP.

(57) ABSTRACT

An electric motor drive system having current detecting sections for detecting the currents flowing into electric motors, speed variation calculating sections for calculating the speed variation estimating values for the electric motors in accordance with the motor currents detected by the current detecting sections and the current command values for the motors corresponding to the detected currents and a speed uniformizing voltage compensating section for delivering the values that serve to compensate the amplitudes of the voltages applied to the electric motors in such a manner that the speed variation estimating values calculated by the speed variation calculating sections become equal to a predetermined value.

7 Claims, 7 Drawing Sheets

ELECTRIC MOTOR DRIVE SYSTEM AND ELECTRIC MOTOR CONTROL METHOD

BACKGROUND OF THE INVENTION

This invention relates to an electric motor drive system which estimates the variation of the rotational speed of an electric motor and controls the variation to render it to a predetermined value such as zero, and more particularly to a technique for performing such control without using any speed sensor.

The twin drive system, which is an apparatus for driving two electric motors whose rotating shafts are physically and mechanically coupled to each other via a gear box so as to rotationally drive a common load, has found its broad application in the manufacturing process for various industrial materials like rubber and cement.

In such a twin drive system, the two electric motors are sometimes driven by two respective power converters so that the speeds of the two motors can be variably controlled. When such two electric motors coupled to a common mechanical load are driven, the rotational speeds of the two motors must be adjusted to the same value by the help of a common mechanical system.

However, if the cogged wheels in the common mechanical system are not uniformly worked, there sometimes arises unbalance on the mechanical torques exerted on the rotary shafts of the electric motors so that the rotational speeds of the motors are rendered uneven with each other. The uneven rotational speeds may impose physically adverse effect on the mechanical load and the common mechanical system (such as gear clattering).

To eliminate such adverse effect, the rotational speeds of the motors must be adjusted to the same value, even if there are unbalanced mechanical loads imposed on the rotary shafts of the two electric motors. Many examples of the conventional methods for speed control of electric motors have resorted to the use of speed sensors. However, if the ambient temperature around the electric motors is very high, or if the motors are subjected to vibratory conditions, then the installation of speed sensors becomes difficult. In such a case, it is preferable not to use speed sensors.

For example, JP-A-6-346157 discloses a conventional method for controlling the twin drive system without using speed sensors. According to the disclosed method, the difference between the torque currents of the respective electric motors is used to control the frequency so that the torque balance between the two motors can be controlled.

SUMMARY OF THE INVENTION

However, the object of the technique disclosed in JP-A-6-346157 is to make the torques of the respective electric motors even with each other. Accordingly, if there is unbalance between the lord torques, the proper torque control in response to the uneven lord torques cannot be performed so that the rotational speeds of the motors become uneven.

Although the use of speed sensors makes it possible to control the rotational speeds of the electric motors, the speed sensors may not be used sometimes due to unfavorable conditions such as complexity or difficulty in installation (e.g. high ambient temperatures). Also, many techniques have been proposed wherein the rotational speed is estimated when a single electric motor is controlled. Those techniques cannot be free form the errors in speed estimation and the complexity in calculation for control.

One object of this invention is to provide an electric motor drive system wherein, in the case where two or more electric motors coupled mechanically to a common mechanical load are driven at variable speeds, the variations in the rotational speeds of the two or more electric motors can be simply adjusted to a constant value without using speed sensors, in response to the loads imposed on the two or more electric motors.

Another object of this invention is to provide an electric motor drive system wherein, even if only a single electric motor drives a mechanical load, the variation in the rotational speed of the electric motor can be simply adjusted to a constant value.

The above described and other objects and the novel features of this invention will be apparent when the following part of the specification is read in reference to the attached drawings.

The brief description of the typical examples of the inventions disclosed in the present application will be as follows.

Namely, one general concept underlying the typical examples is the provision of the speed variation calculating sections for calculating the speed variation estimating values for two or more electric motors in accordance with the motor currents detected by the current detecting sections and the motor current command values corresponding to the motor currents, and the compensatory calculating section for delivering the outputs that serve to compensate the amplitudes, frequencies and phases of the voltages applied to the plural electric motors in such a manner that the speed variation estimating values calculated by the speed variation calculating sections become equivalent.

Another general concept underlying the typical examples is the provision of the speed variation calculating section for calculating the speed variation estimating value for an electric motor in accordance with the motor current detected by the current detecting section and the motor current command value corresponding to the motor current, and the compensatory calculating section for delivering the output that serves to compensate the amplitude, frequency and phase of the voltage applied to the electric motor in response to the speed variation estimating value calculated by the speed variation calculating section.

The advantages, simply described, of the typical examples of the inventions disclosed in the present application will be as follows.

Namely, according to the typical examples of the inventions disclosed in the present application, when two or more electric motors mechanically coupled to one another via a common mechanical system are driven by as many power converters, the variations in the rotational speeds of the respective motors can be maintained equivalent without using any speed sensor, so that gear clattering and stress on the mechanical system due to different rotational speeds can be reduced. Also, even in a system where a single electric motor drives a mechanical system, the variation in the rotational speed can be reduced and therefore the stress on the mechanical system can be reduced.

Other objects, features and advantages of the invention will become apparent from the following description of the embodiments of the invention taken in conjunction with the accompanying drawings.

DESCRIPTION OF THE EMBODIMENTS

Figure 1:
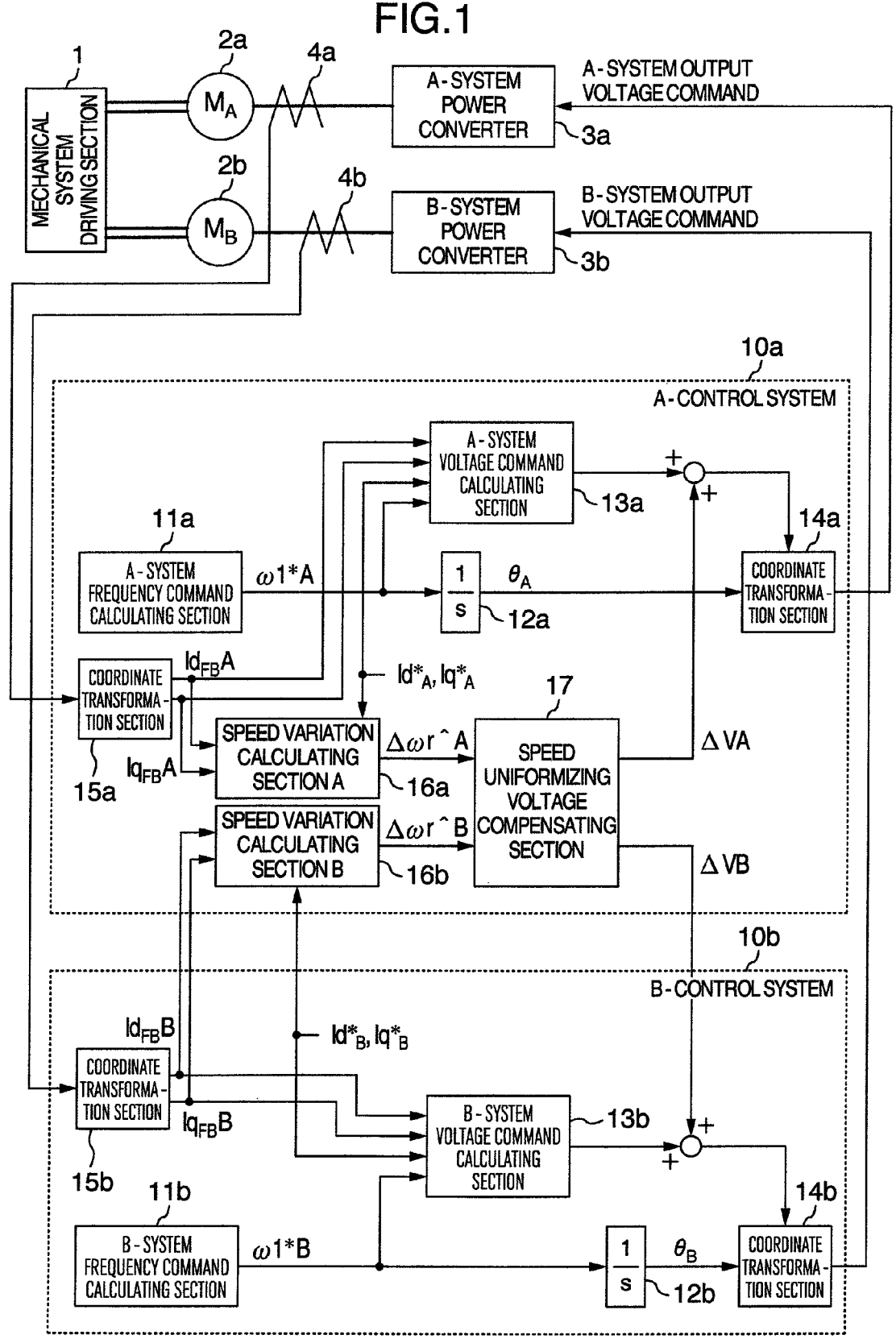
FIG. 1 schematically shows the configuration of an electric motor drive system as a first embodiment of this invention.

The embodiments of this invention will be described below in detail in reference to the attached drawings. Throughout the drawings, like components are indicated in principle at like reference numerals and the repeated descriptions of the like components will be omitted.

Embodiment 1

The configuration of an electric motor drive system as a first embodiment of this invention will be described in reference to FIG. 1. FIG. 1 schematically shows the entire structure of a twin drive system including an electric motor drive system, that is, the configuration of an electric motor drive system as a first embodiment of this invention.

As shown in FIG. 1, an A-system electric motor 2a and a B-system electric motor 2b are coupled to a drive section 1 for a mechanical system (hereafter referred to as mechanical system driving section). The two electric motors 2a and 2b are mechanically coupled to each other in the mechanical system driving section 1 via, for example, cogged wheels. The electric motors 2a and 2b are driven by an A-system power converter 3a and a B-system power converter 3b, respectively. The currents flowing into the electric motors 2a and 2b are detected by current detecting sections 4a and 4b, respectively.

A control system 10a for A-system (hereafter referred to as A-control system) and a control system 10b for B-system (hereafter referred to as B-control system) are connected respectively with the A-system power converter 3a and B-system power converter 3b so as to deliver A- and B-output voltage commands for controlling the power converters 3a and 3b.

The A-control system 10a comprises an A-system frequency command calculating section 11a, an integrating section 12a, an A-system voltage command calculating section 13a, coordinate transformation sections 14a and 15a, a speed variation calculating section A 16a, a speed variation calculating section B 16b and a speed uniformizing voltage compensating section (compensatory calculating section) 17.

The B-control system 10b comprises a B-system frequency command calculating section 11b, an integrating section 12b, a B-system voltage command calculating section 13b, and coordinate transformation sections 14b, 15b.

The operations of the A- and B-control systems 10a, 10b for controlling the power converter 3a, 3b will be described below.

In the A- and B-control systems 10a, 10b, the frequency commands ω1*A, ω1*B from the A- and B-system frequency command calculating sections 11a, 11b are supplied to the integrating sections 12a, 12b to calculate the phases $\theta_A$, $\theta_B$, respectively.

Using the phases $\theta_A$ the coordinate transformation section 14a converts the sum of the DC voltage command obtained by the A-system voltage command calculating section 13a and the output of the speed uniformizing voltage compensating section 17, which will be described later, to an AC voltage command that controls the power converter 3a. And using the phase $\theta_B$, the coordinate transformation section 14b converts the sum of the DC voltage command obtained by the B-system voltage command calculating section 13b and the output of the speed uniformizing voltage compensating section 17, to an AC voltage command that controls the power converter 3b.

According to these voltage commands, the power converters 3a, 3b supply voltages to the electric motors 2a, 2b, respectively, through, for example, PWM control.

Now, the operations of the A- and B-control systems 10a, 10b will be described with respect to the speed uniformizing control that features this embodiment.

The current detecting sections 4a, 4b detect the primary AC currents flowing into the electric motors 2a, 2b, which the coordinate transformation sections 15a, 15b transform into the corresponding DC components each of which is split into a torque current component and an exciting current component through vector transformation. The coordinate transformation sections 15a, 15b also use the phases $\theta_A$, $\theta_B$, as with the coordinate transformation sections 14a, 14b, though that situation was omitted in FIG. 1.

The vector control method wherein control is performed by dividing the control axis into the torque axis and the magnetic exciting axis, is widely known and the description thereof will be omitted here. The detected torque current values $Iq_{FB}A$, $Iq_{FB}B$ and the detected exciting current values $Id_{FB}A$, $Id_{FB}B$, obtained above are fed respectively to the speed variation calculating sections A 16a, B 16b to calculate speed variation estimating values $\Delta\omega r\hat{\ }A$, $\Delta\omega r\hat{\ }B$.

How $\Delta\omega r\hat{\ }A$ and $\Delta\omega r\hat{\ }B$ are obtained will be described below. The torque current Iq flowing into the electric motor can be obtained according to the following expression (1), from the inverter output voltage that depends on the inverter frequency ω1 and the induced voltage that depends on the rotational speed of the motor.

$$Iq = M/L2 \times (\omega1 \times \Phi2d^* - \omega r \times \Phi2d)/(r\sigma + L\sigma \cdot s) \quad (1),$$

where M, L2, $\Phi2d^*$, $\Phi2d$, rσ, Lσ and s denote the mutual inductance, secondary inductance, secondary magnetic flux command value, secondary flux, motor resistance, motor stray inductance of the electric motor and the differential operator, respectively.

The above expression (1) is a simplified one rendered under the assumption that the values M and L2 set in control are the same as the actual values M and L2 and that the interference term with respect to the electric motor is canceled according to vector control. If the varying components are indicated by being prefixed with "Δ" in the expression (1) and if it is assumed that the frequency variation is sufficiently greater than the magnetic flux variation and that $\Phi2d=\Phi2d^*$, then the expression (1) can be approximately rendered to the following expression (2).

$$\Delta Iq = M/L2 \times (\Delta\omega1 - \Delta\omega r) \times \Phi2d^*/(r\sigma + L\sigma \cdot s) \quad (2)$$

If Δω1 is assumed to be equal to the variation Δωs of the slip frequency arising from ΔIq when the electric motor in question is of induction type, then the expression (2) can be further reduced to the following expression (3). It was assumed here that the variation of Id is sufficiently smaller than that of Iq. T2 indicates the secondary time constant of the electric motor.

$$\Delta\omega1 = \Delta\omega s = 1/T2 \times Iq/Id^* \quad (3)$$

From the expressions (1) and (2), the estimated value $\Delta\omega r\hat{\ }$ can be obtained according to the following expression (4).

Here, r1 indicates the primary resistance of the electric motor, and equations such as T2=L2/r2 and $\Phi 2d^* = M \cdot Id^*$ were used.

$$\Delta\omega r^{\wedge} = -(r1+L\sigma \cdot s) \times \Delta Iq/(M/L2 \times \Phi 2d^*) \quad (4)$$

Here, $\Delta Iq$ has only to be obtained as the detected current value $Iq_{FB}$– the current command value $Iq^*$.

As described above, the rotational speed variation $\Delta\omega r^{\wedge}$ is proportional to $\Delta Iq$, and the motor constant can be simply calculated by using the motor resistance value r1 (this includes the electric resistance of the cable connecting the power converter with the electric motor), the motor stray inductance $L\sigma$ and the rated magnetic flux $\Phi 2d^*$.

If the frequency variation $\Delta\omega 1$ and the flux variation $\Delta\Phi 2d$ are detected to improve precision and if the exciting current variation $\Delta Id$ is used by taking the term concerning the interference within the motor into consideration, then $\Delta\omega r^{\wedge}$ can also be obtained as given by the following expression (5).

$$\Delta\omega r^{\wedge} = \{-(r\sigma + L\sigma \cdot s) \times \Delta Iq - \omega 1 \cdot L\sigma \times \Delta Id + \quad (5)$$
$$M/L2 \times \Delta\omega 1 \times \Phi 2d^* + M/L2 \times \omega 1 \times \Delta\Phi 2d\}/(M/L2 \times \Phi 2d^*)$$

The actual frequency variation in the power converter output may be used as $\Delta\omega 1$. The variation in Id, i.e. $\Delta Id(=Id_{FB}-Id^*)$, for example, may be used as $\Delta\Phi 2d$ to derive the equation $\Delta\Phi 2d = M \times \Delta Id$.

Figure 2:
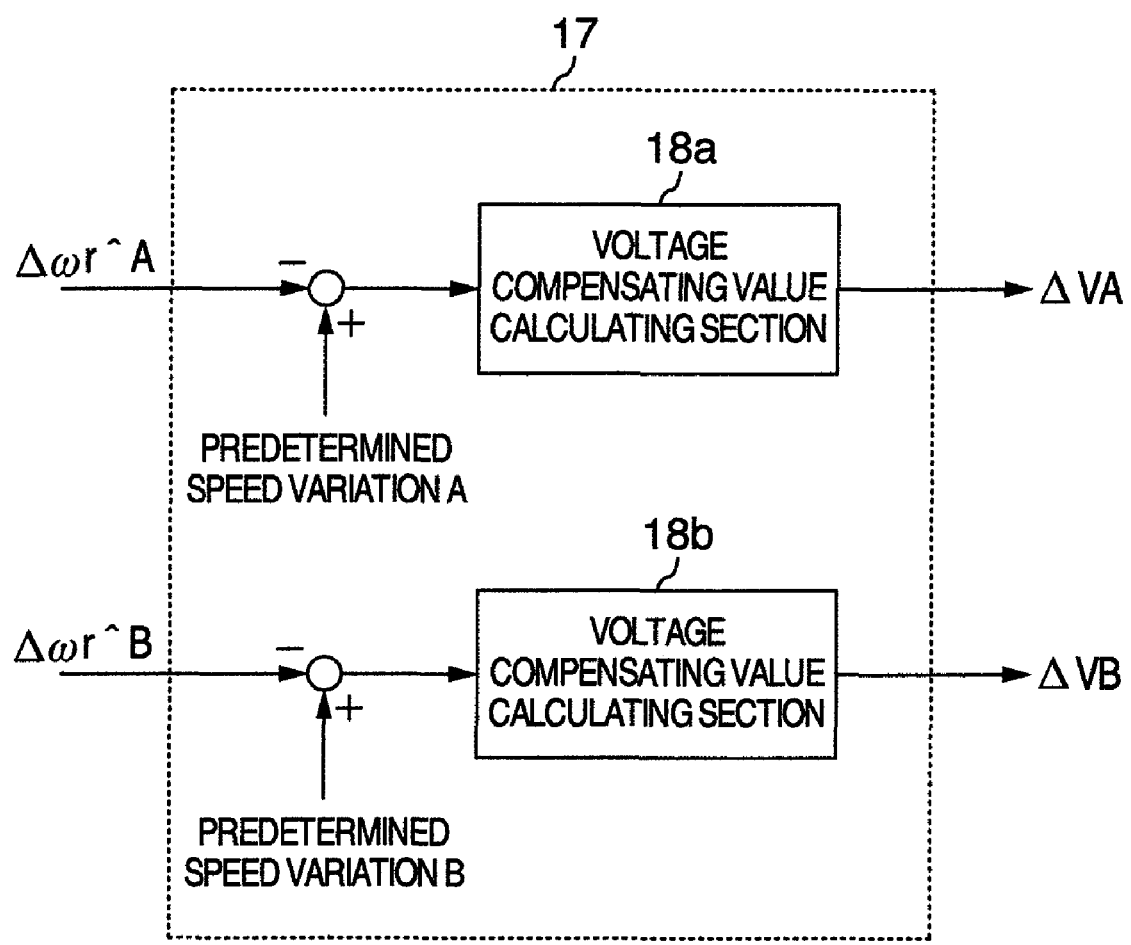
FIG. 2 schematically shows the configuration of a speed uniformizing voltage compensating section for use in the electric motor drive system as the first embodiment of this invention.

Now, the procedure for uniformizing the speed variations by using $\Delta\omega r^{\wedge}$ in the speed uniformizing voltage compensating section 17 will be described in reference to FIG. 2. FIG. 2 schematically shows the configuration of the speed uniformizing voltage compensating section for use in the electric motor drive system as the first embodiment of this invention.

As shown in FIG. 2, the speed uniformizing voltage compensating section 17 comprises a voltage compensating value calculating section A 18*a* and a voltage compensating value calculating section B 18*b*.

The speed uniformizing voltage compensating section 17 calculates the voltage compensating component $\Delta V$ on the basis of the obtained $\Delta\omega r^{\wedge}$. Namely, the difference between the speed variation estimating value $\Delta\omega r^{\wedge}A$ and the predetermined speed variation A, and the difference between the speed variation estimating value $\Delta\omega r^{\wedge}B$ and the predetermined speed variation B, are calculated, and then the voltage compensating value calculating sections A 18*a*, B 18*b* calculate voltage compensating values $\Delta VA$, $\Delta B$, respectively in such a manner that the speed variation estimating values $\Delta\omega r^{\wedge}A$, $\Delta\omega r^{\wedge}B$ may become equal to the predetermined speed variations A, B, respectively.

In consideration of a model simulating the internal of the electric motor in question, the voltage applied to the motor will have a small lagging phase (within 90 degrees) due to the internal impedance $r\sigma + L\sigma \cdot s$ of the motor. This lagging phase gives rise to a variation in the torque current Iq, which is reflected on the torque component. The torque current variation, further lagging by 90 degrees, is reflected on the rotational speed of the motor.

If it is desired to reduce the speed variation to zero by zeroing the predetermined speed variation, the speed uniformizing voltage compensating section 17 makes such compensation that the phase of the input $\Delta\omega r^{\wedge}$ is advanced by $-\pi/4 + \tan^{-1}(L\sigma \cdot \omega/r\sigma)$. Here, $\omega$ denotes the angular frequency of the speed variation.

To do this compensation, the voltage compensating value calculating sections 18*a*, 18*b* may perform such calculations equivalent to $-(r\sigma + L\sigma \cdot s) \cdot s$ with respect to the respective inputs $\Delta\omega r^{\wedge}A$, $\Delta\omega r^{\wedge}B$ and produce the outputs $\Delta VA$, $\Delta VB$ which are proportional to the calculated values.

According to this embodiment, the speed variations $\Delta\omega r^{\wedge}$ of the motors are simply calculated from the detected values of the currents flowing into the motors, the current command values and the motor constants, and the voltage command values are compensated in such a manner that $\Delta\omega r^{\wedge}$ may be reduce to zero.

Consequently, even if there is load unbalance between the systems A and B, the speed variations can be reduced so that the speed unbalance can also be reduced.

In the case where the systems A and B are mechanically coupled to each other, it is considered that the average of the rotational speeds of one electric motor is kept almost equal to the average of the rotational speeds of the other electric motor and that the variations of the rotational speeds of the motors come to differ from each other due to the load unbalance.

Accordingly, in this embodiment, the rotational speeds of the motors can be maintained at a constant value by reducing the speed unbalance between the two motors.

In this embodiment, description is limited to the configuration consisting of two systems, system A and system B. However, the idea disclosed in this embodiment can be equally applied to the case where N electric motors are driven by N power converters (N indicates integers greater than two). Also, the calculation of speed variation is performed in the system A alone, but it may be performed in both the systems. In addition, the calculation of the compensating values may be performed in both the systems.

Embodiment 2

This embodiment is dedicated to the single drive control which is applied to only one system in the first embodiment described above.

Figure 3:
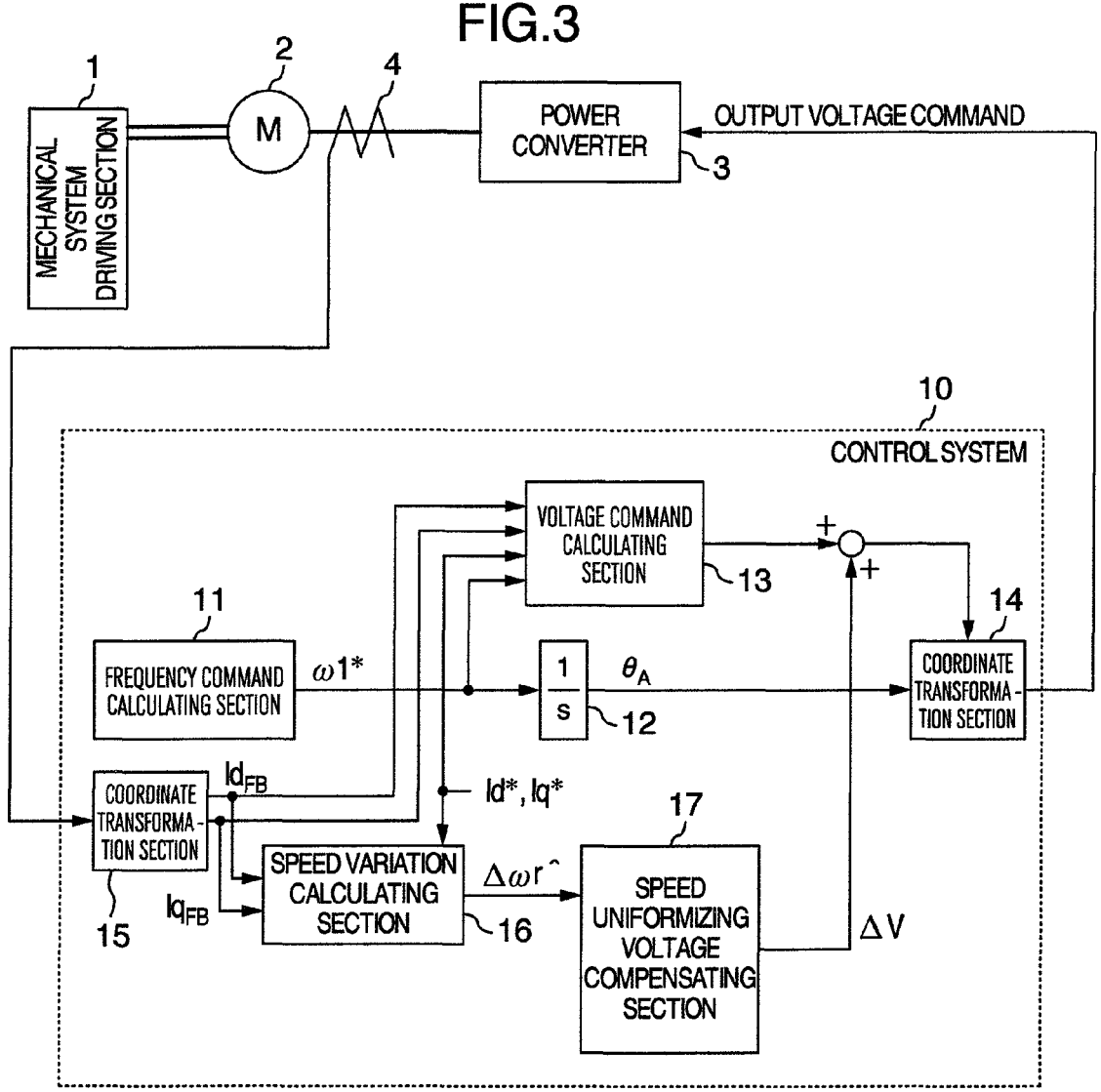
FIG. 3 schematically shows the configuration of an electric motor drive system as a second embodiment of this invention.

The configuration of a motor drive system as a second embodiment of this invention will be described in reference to FIG. 3. FIG. 3 shows the entire structure of the single drive system including the motor drive system as the second embodiment of this invention.

As shown in FIG. 3, a mechanical system driving section 1 is coupled to an electric motor 2. The electric motor 2 is mechanically coupled to the mechanical system driving section 1 through, for example, cogged wheels. The electric motor 2 is electrically driven by a power converter 3. The current flowing into the motor 2 is detected by a current detecting section 4.

The power converter 3 is connected with a control system 10 which delivers an output voltage command for controlling the power converter 3.

The control system 10 comprises a frequency command calculating section 11, an integrating section 12, a voltage command calculating section 13, coordinate transformation sections 14 and 15, a speed variation calculating section 16, and a speed uniformizing voltage compensating section 17.

Now, the operation of the control system 10 for controlling the power converter 3 will be described.

The operation of this second embodiment is similar to that of the above described first embodiment in that this embodiment is dedicated to the single drive system that is equivalent to a half of the twin drive system described as the first embodiment.

In this embodiment, too, if the rotational speed of the electric motor is fluctuating due to the load fluctuation, the speed variation is estimated and the voltage compensation follows in such a manner that the speed variation can be reduced.

The speed uniformizing voltage compensating section 17 may take care of only one (e.g. system A) of the systems A and B shown in FIG. 2. Accordingly, the speed variation can be suppressed as in the first embodiment.

Embodiment 3

This third embodiment differs from the second embodiment in that the speed estimating value is calculated to cause the speed control section to perform speed control.

Figure 4:
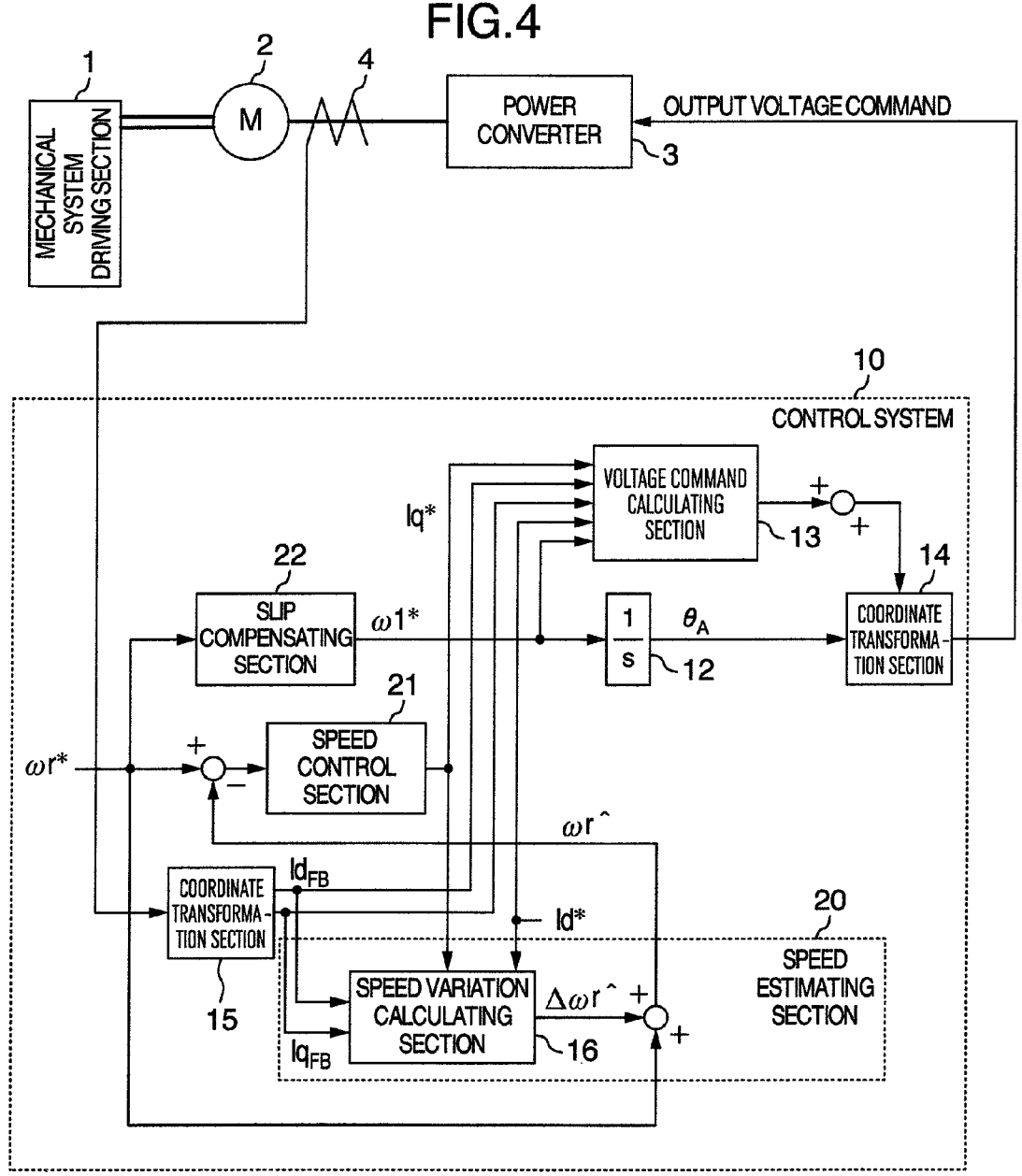
FIG. 4 schematically shows the configuration of an electric motor drive system as a third embodiment of this invention.

The configuration of the electric motor drive system as the third embodiment of this invention will now be described in reference to FIG. 4. FIG. 4 shows the entire structure of the single drive system including the motor drive system as the third embodiment of this invention.

As shown in FIG. 4, a mechanical system driving section 1 is coupled to an electric motor 2. The electric motor 2 is mechanically coupled to the mechanical system driving section 1 through, for example, cogged wheels. The electric motor 2 is electrically driven by a power converter 3. The current flowing into the motor 2 is detected by a current detecting section 4.

The power converter 3 is connected with a control system 10 which delivers an output voltage command for controlling the power converter 3.

The control system 10 comprises an integrating section 12, a voltage command calculating section 13, coordinate transformation sections 14 and 15, a speed variation calculating section 16, a speed estimating section 20, a speed control section 21 and a slip compensating section 22.

Then, the operation of the control system 10 for controlling the power converter 3 will be described.

The speed estimating section 20 calculates the speed estimating value $\omega r\hat{}$ by adding the speed command $\omega r^*$ to the output of the speed variation calculating section 16. Accordingly, the speed control section 21 performs speed control.

The frequency $\omega 1^*$ is calculated by the slip compensating section 22.

In this embodiment, the speed estimating value $\omega r\hat{}$ is simply obtained by using the speed variation estimating value $\Delta\omega r\hat{}$, and the associated voltage, frequency and phase are controlled in accordance with the obtained value $\omega r\hat{}$. This makes the speed control easy and consequently can improve the precision in reducing the speed variation.

Embodiment 4

The fourth embodiment of this invention differs from the first embodiment described above in that the speed uniformizing voltage compensating section is replaced by the speed uniformizing frequency compensating section. Thus, the frequency compensating value is calculated to compensate the systems A and B with frequency.

Figure 5:
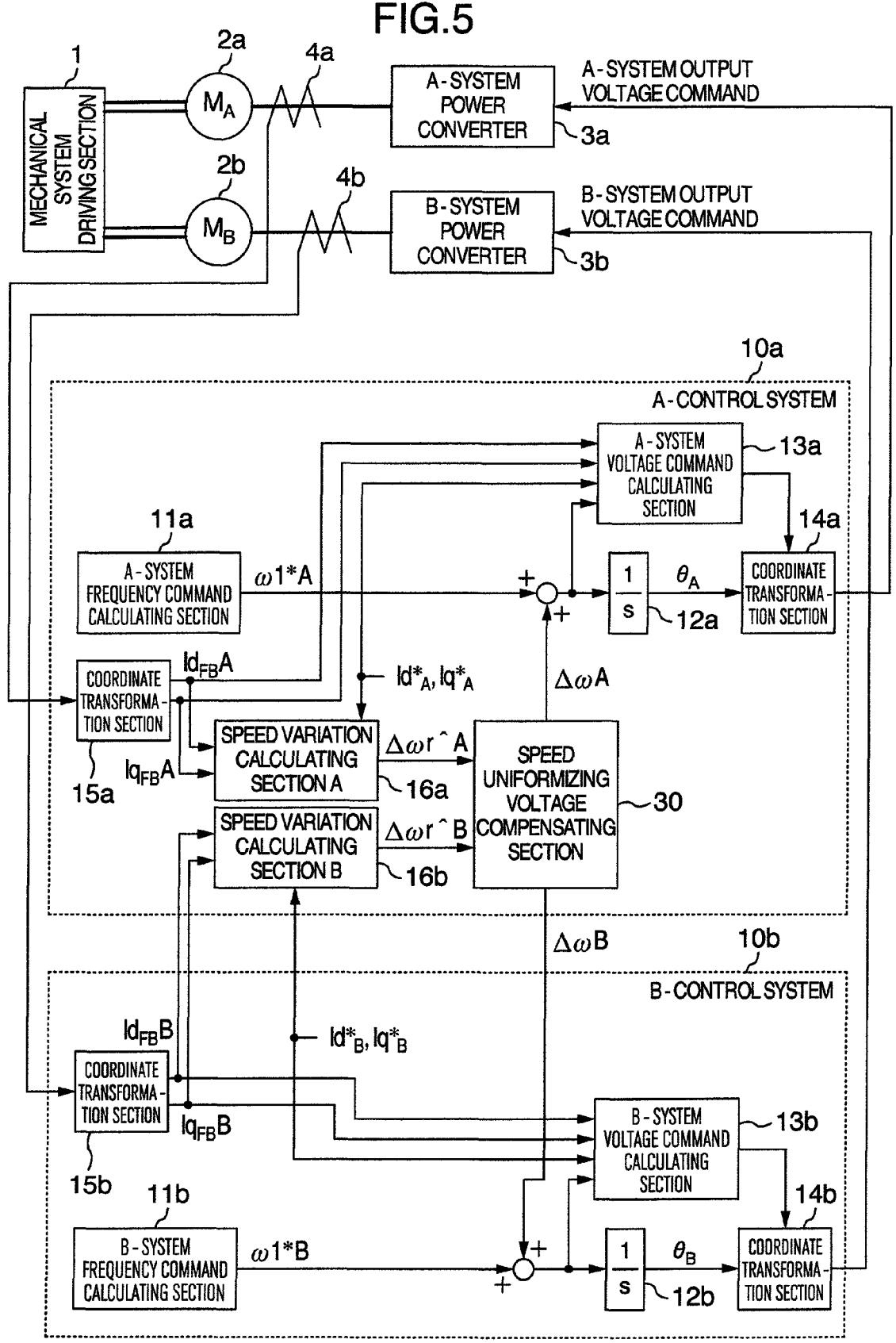
FIG. 5 schematically shows the configuration of an electric motor drive system as a fourth embodiment of this invention.

The configuration of the electric motor drive system as the fourth embodiment of this invention will now be described in reference to FIG. 5. FIG. 5 shows the entire structure of the twin drive system including the motor drive system as the fourth embodiment of this invention.

As shown in FIG. 5, an A-system electric motor 2a and a B-system electric motor 2b are coupled to a drive section 1 for a mechanical system (hereafter referred to as mechanical system driving section). The two electric motors 2a and 2b are mechanically coupled to each other in the mechanical system driving section 1 via, for example, cogged wheels. The electric motors 2a and 2b are driven by an A-system power converter 3a and a B-system power converter 3b, respectively.

The currents flowing into the electric motors 2a and 2b are detected by current detecting sections 4a and 4b, respectively.

A control system 10a for A-system (hereafter referred to as A-control system) and a control system 10b for B-system (hereafter referred to as B-control system) are connected respectively with the A-system power converter 3a and B-system power converter 3b so as to deliver A- and B-output voltage commands for controlling the power converters 3a and 3b.

The A-control system 10a comprises an A-system frequency command calculating section 11a, an integrating section 12a, an A-system voltage command calculating section 13a, coordinate transformation sections 14a and 15a, a speed variation calculating section A 16a, a speed variation calculating section B 16b and a speed uniformizing frequency compensating section (compensatory calculating section) 30.

The B-control system 10b comprises a B-system frequency command calculating section 11b, an integrating section 12b, a B-system voltage command calculating section 13b, and coordinate transformation sections 14b, 15b.

The operations of the A- and B-control systems 10a, 10b for controlling the power converter 3a, 3b will be described below.

According to this embodiment, the speed uniformizing frequency compensating section 30 calculates the frequency compensating values $\Delta\omega A$, $\Delta\omega B$ in accordance with the calculated speed variation estimating values $\Delta\omega r\hat{}A$, $\Delta\omega r\hat{}B$. The values $\Delta\omega A$, $\Delta\omega B$ compensate the frequencies in the A- and B-systems, respectively.

The calculation of $\Delta\omega A$, $\Delta\omega B$ will be performed as follows.

As described in the first embodiment, the output $\Delta V$ of the speed uniformizing voltage compensating section 17 is so calculated as to generate reverse torque that tends to reduce $\Delta\omega r\hat{}$ to zero.

From the relationship that voltage $\propto$ frequency×magnetic flux, it follows that $\Delta V \propto \Delta\omega \times \Phi 2d^*$. And $\Delta\omega$ may be so calculated as to become equal to a value proportional to $\Delta V$ obtained in the first embodiment described above.

According to this embodiment, the frequencies are controlled in such a manner that the speed variation in the system A becomes equal to that in the system B. Thus, the same effect as with the first embodiment can be obtained.

In place of controlling the frequencies, the compensated phase obtained by integrating $\Delta\omega$ may be used as a phase for coordinate transformation.

Also, even in the case of a single drive system as in the second embodiment described above, the frequency compensation effected by calculating $\Delta\omega$ in accordance with $\Delta\omega r\hat{}$ enables the suppression of speed variation in the single drive system as in the second embodiment.

Embodiment 5

The fifth embodiment of this invention differs from the first embodiment in that control is carried out with the average of the speed variation estimating values.

Figure 6:
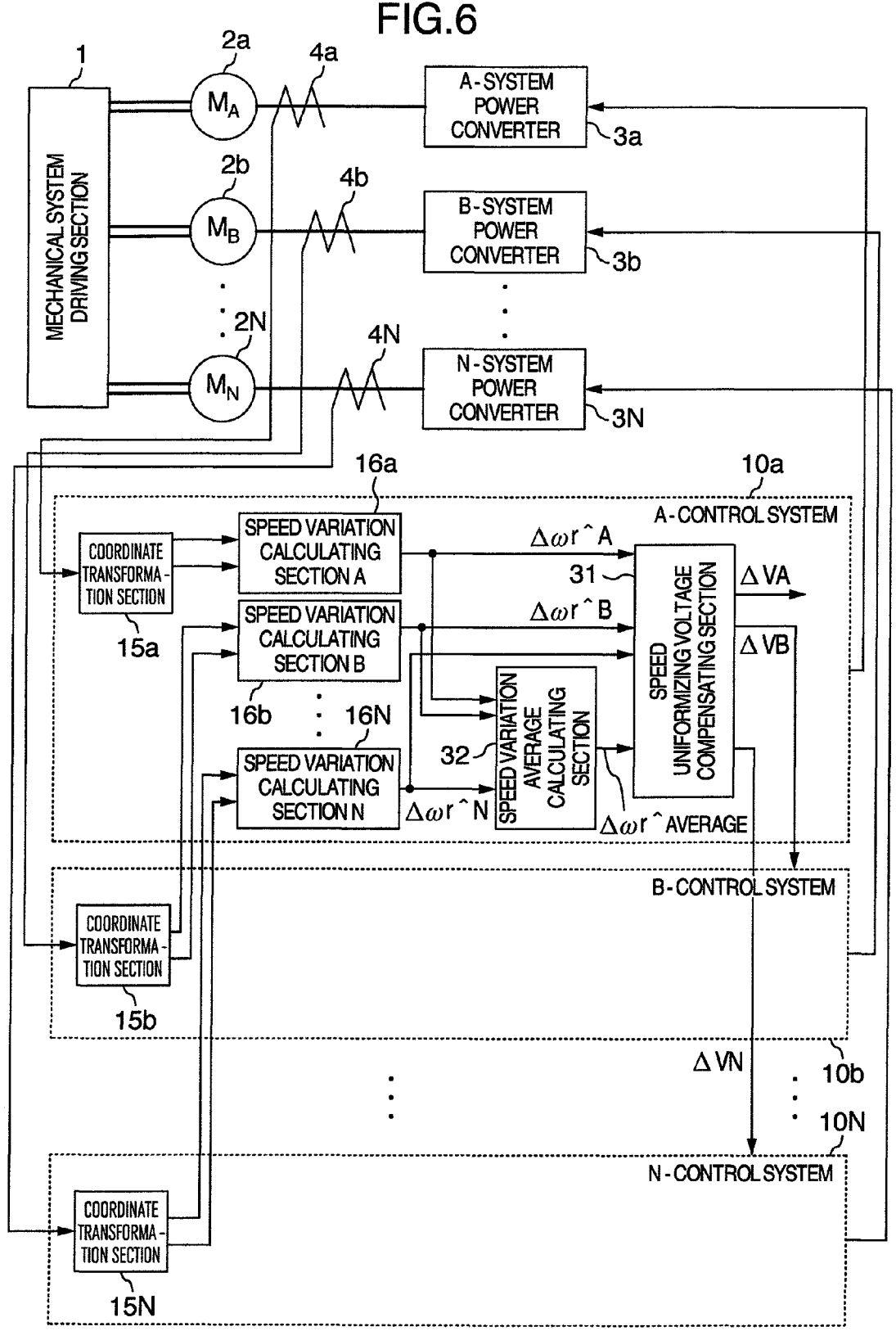
FIG. 6 schematically shows the configuration of an electric motor drive system as a fifth embodiment of this invention.

The configuration of an electric motor drive system as a fifth embodiment of this invention will be described in reference to FIG. 6. FIG. 6 schematically shows the entire structure of a drive system including an electric motor drive system, that is, the configuration of an electric motor drive system as a fifth embodiment of this invention.

As shown in FIG. 6, N (N is an integer greater than one) electric motors 2a~2N are coupled to a mechanical system driving section 1. The N electric motors are mechanically coupled to one another in the mechanical system driving section 1 via, for example, cogged wheels. The electric motors 2a~2N are driven by N power converters 3a~3N, respectively. The currents flowing into the electric motors 2a~2N are detected by current detecting sections 4a~4N, respectively.

A- to N-control systems 10a~10N are connected respectively with the N power converters 3a~3N so as to deliver A- to N-output voltage commands for controlling the N power converters 3a~3N.

The A-control system 10a comprises a coordinate transformation section 15a, a speed variation calculating section A 16a~a speed variation calculating section N 16N, a speed uniformizing voltage compensating section (compensatory calculating section) 31, and a speed variation average calculating section 32. The voltage converters 3a~3N are controlled respectively by the voltage compensating values ΔVA~ΔVN outputted from the speed uniformizing voltage compensating section 31.

The operations of the A- to N-control systems 10a~10N for controlling the power converters 3a~3N will be described below.

The speed variation calculating section A 16a~ the speed variation calculating section N 16N calculate the speed variation estimating values $\Delta\omega r\hat{}A$~$\Delta\omega r\hat{}N$ for the N electric motors 2a~2N, and the speed variation average calculating section 32 calculates the average $\Delta\omega$ of the speed variation estimating values $\Delta\omega r\hat{}A$~$\Delta\omega r\hat{}N$.

The averaging algorithm to be employed here may be any one of arithmetic mean, geometrical mean and harmonic mean.

The speed uniformizing voltage compensating section 31 inputs the speed variation estimating values $\Delta\omega r\hat{}A$~$\Delta\omega r\hat{}$ and the average $\Delta\omega$ of the speed variation estimating values $\Delta\omega r\hat{}A$~$\Delta\omega r\hat{}N$, and calculates the voltage compensating values ΔVA~ΔVN for the A- to N-control systems 10a~10N.

The speed uniformizing voltage compensating section 31 may consist of N units, each being as shown, for example, in FIG. 2, necessary for calculating ΔVA~ΔVN. The average of the speed variation estimating values $\Delta\omega r\hat{}A$~$\Delta\omega r\hat{}N$ is used as the predetermined speed variation. The differences between the average and the respective speed variation estimating values $\Delta\omega r\hat{}A$~$\Delta\omega r\hat{}N$ are calculated. And the N voltage compensating values ΔVA~ΔVN are calculated by the N voltage compensating value calculating sections.

Alternatively, instead of obtaining the voltage compensating values ΔV's, the frequency compensating values Δω's can be obtained to compensate for the frequencies of the respective control systems as in the fourth embodiment.

According to this embodiment, if the plural electric motors have different speed variations, the voltages, frequencies or phases are controlled in such a manner that each of the speed variations becomes equal to the average of the speed variations. Accordingly, the respective speed variations become equal to the average of the speed variations so that speed unbalance can be suppressed.

Embodiment 6

The sixth embodiment of this invention is characterized in that, instead of calculating the speed variation estimating values as in the fourth embodiment described above, the frequency compensating values Δω's are directly calculated from the detected current values.

Figure 7:
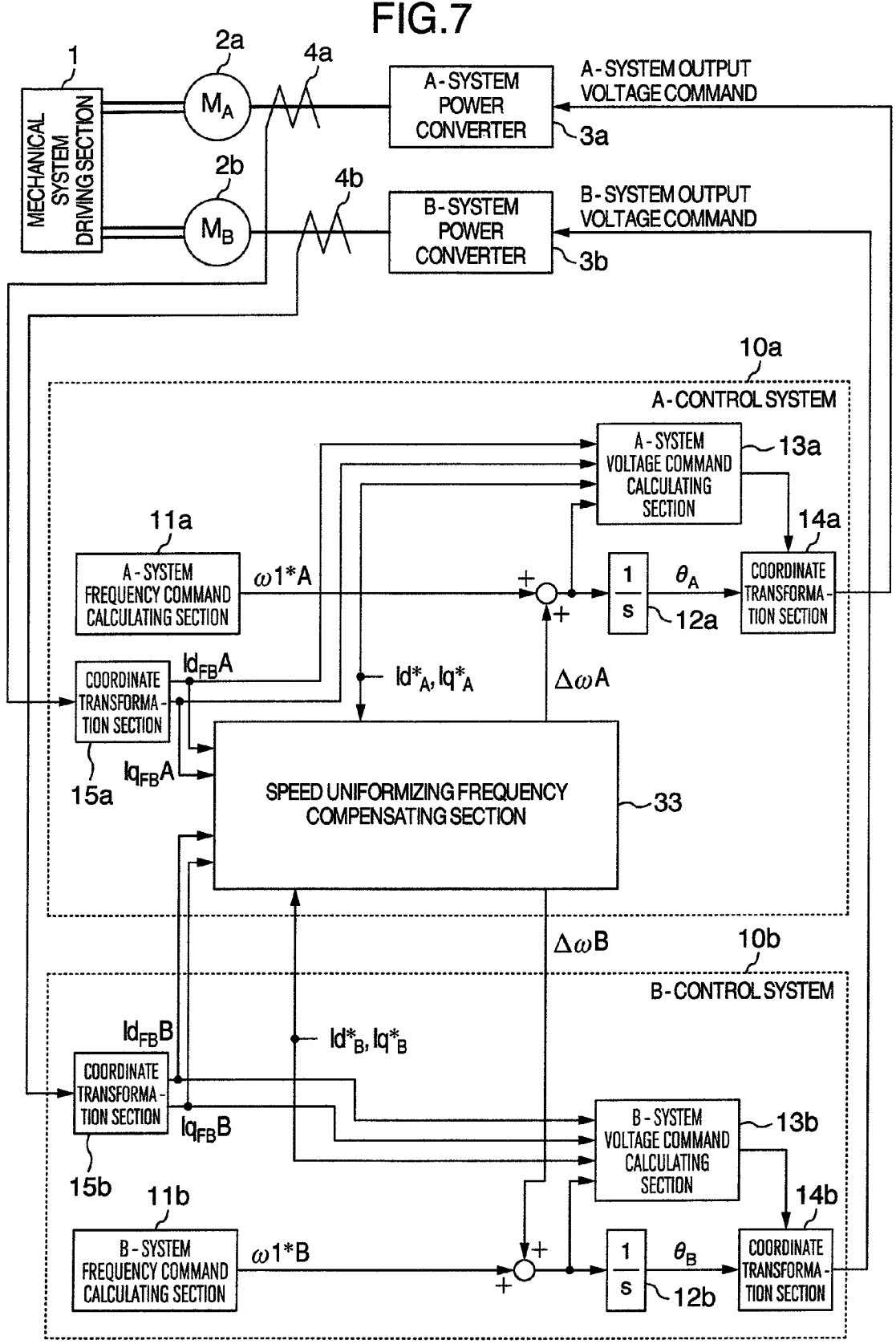
FIG. 7 schematically shows the configuration of an electric motor drive system as a sixth embodiment of this invention.

The configuration of an electric motor drive system as a sixth embodiment of this invention will be described in reference to FIG. 7. FIG. 7 schematically shows the entire structure of a twin drive system including an electric motor drive system, that is, the configuration of an electric motor drive system as a sixth embodiment of this invention.

As shown in FIG. 7, an A-system electric motor 2a and a B-system electric motor 2b are coupled to a mechanical system driving section 1. The two electric motors 2a and 2b are mechanically coupled to each other in the mechanical system driving section 1 via, for example, cogged wheels. The electric motors 2a and 2b are driven by an A-system power converter 3a and a B-system power converter 3b, respectively. The currents flowing into the electric motors 2a and 2b are detected by current detecting sections 4a and 4b, respectively.

A- and B-control systems 10a, 10b are connected respectively with the A- and B-system power converters 3a, 3b so as to deliver the A- and B-system output voltage commands for controlling the A- and B-system power converters 3a, 3b.

The A-control system 10a comprises an A-system frequency command calculating section 11a, an integrating section 12a, an A-system voltage command calculating section 13a, coordinate transformation sections 14a and 15a, and a speed uniformizing frequency compensating section (compensatory calculating section) 33.

The B-control system 10b comprises a B-system frequency command calculating section 11b, an integrating section 12b, a B-system voltage command calculating section 13b, and coordinate transformation sections 14b, 15b.

The operations of the A- and B-control systems 10a, 10b for controlling the power converter 3a, 3b will be described below.

Instead of calculating the speed variation estimating values, the speed uniformizing frequency compensating section 33 calculates the frequency compensating values Δω's directly from the detected current values. The calculation algorithm is as follows.

From the expression (5) given before, the following expressions (6) and (7) can be derived for the systems A and B, respectively. In the expressions (6) and (7), the quantities postfixed with the letters A and B are associated with the systems A and B, respectively.

$$\Delta\omega r^\wedge A = \{-(r\sigma A + L\sigma A \cdot s) \times \Delta IqA - \\ \omega 1A \cdot L\sigma A \times \Delta IdA + MA/L2A \times \Delta\omega 1A \times \Phi 2dA^* + \\ MA/L2A \times \omega 1A \times \Delta\Phi 2dA\}/(MA/L2A \times \Phi 2dA^*) \quad (6)$$

$$\Delta\omega r^\wedge B = \{-(r\sigma B + L\sigma B \cdot s) \times \Delta IqB - \\ \omega 1B \cdot L\sigma B \times \Delta IdB + MB/L2B \times \Delta\omega 1B \times \Phi 2dB^* + \\ MB/L2B \times \omega 1B \times \Delta\Phi 2dB\}/(MB/L2B \times \Phi 2dB^*) \quad (7)$$

If it is assumed that the motor constant and the magnetic flux command value $\Phi 2d^*$ in the system A are equal to those in the system B under the condition $\Delta\omega r\hat{}A = \Delta\omega r\hat{}B$, that the variation in ω1 is smaller than the variation in current, that ω1 approximates to the speed command ωr*, and that the term including Δω1 is sufficiently greater than the term including ΔΦ2d, then the following expression (8) holds.

$$\Delta\omega 1B = \{-(r\sigma + L\sigma \cdot s) \times (\Delta IqA - \Delta IqB) - \omega r^* \cdot L\sigma \times (\Delta IdA - \Delta IdB)\}/ \\ (M/L2 \times \Phi 2d^*) + \Delta\omega 1A \quad (8)$$

The first and second terms of the expression (8) can be calculated respectively from detected current values by using the equalities $\Delta IqA - \Delta IqB = Iq_{FB}A - Iq_{FB}B$ and $\Delta IdA - \Delta IdB = Id_{FB}A - Id_{FB}B$.

Also, $\Delta\omega 1A$ in the third term may be equated to zero, or if the electric motors in question are of induction type with $\Delta\omega 1A$ equivalent to the slip compensating value, then $\Delta\omega 1A$ can be obtained by using the equation $\Delta\omega 1A=1/T2\times\Delta IqA/\Delta IdA$ where $\Delta IqA=Iq_{FB}A-IqA^*$.

And frequency compensation can be performed in the respective control systems by substituting $\Delta\omega 1B$ obtained from the expression (8) for $\Delta\omega B$ and equating $\Delta\omega A$ to zero. $\Delta\omega 1A$ obtained by equating $\Delta\omega 1B$ to zero in the expression (8) or to the slip compensating value may be substituted for $\Delta\omega A$. Or it is also possible to avoid using $\Delta\omega$ directly, and to employ a new compensating value comparable with $\Delta\omega$.

As described above, according to the this embodiment, the speed variation is not directly sought for, but only the frequency compensating value is calculated. Consequently, the speed variations of plural electric motors can be uniformized.

In the foregoing, the present invention has been described in detail by way of embodiments, but it is needless to say that the invention is by no means limited to the exemplified embodiments alone, but that it can be changed, modified or altered in many ways without departing from the gist thereof.

The invention claimed is:

1. An electric motor drive system for driving an electric motor at variable rotational speeds comprising:
   a current detecting section for detecting the current flowing into the electric motor;
   a speed variation calculating section for calculating the speed variation estimating value for the electric motor in accordance with the current detected by the current detecting section and the current command value for the electric motor; and
   a compensatory calculating section for delivering a value that serves to compensate the amplitude, frequency and phase of the voltage applied to the electric motor in accordance with the speed variation estimating value calculated by the speed variation calculating section,
   wherein the compensatory calculating section delivers the value that serves to compensate the amplitude, frequency and phase of the voltage applied to the electric motor in such a manner that the phase of the speed variation estimating value calculated by the speed variation calculating section leads by an amount represented by an equation of $-\pi/4+\tan^{-1}(L\sigma\cdot\omega/r\sigma)$, wherein $\omega$, $L\sigma$ and $r\sigma$ denotes the angular frequency of the speed variation, motor stray inductance of the electric motor and motor resistance respectively.

2. An electric motor drive system for driving an electric motor at variable rotational speeds comprising:
   a current detecting section for detecting the current flowing into the electric motor;
   a speed variation calculating section for calculating the speed variation estimating value for the electric motor in accordance with the current detected by the current detecting section and the current command value for the electric motor; and
   a compensatory calculating section for delivering a value that serves to compensate the amplitude, frequency and phase of the voltage applied to the electric motor in accordance with the speed variation estimating value calculated by the speed variation calculating section,
   wherein the speed variation calculating section calculates the speed variation estimating value proportional to the difference $\Delta I$ between the detected current value of the electric motor and the current command value, on the basis of the motor resistance, the electric resistance of the cable connecting between the power converter and the motor, the stray inductance of the motor and the magnetic flux command value of the motor.

3. An electric motor drive system for driving two or more electric motors at variable rotational speeds, comprising:
   current detecting sections for detecting the currents flowing into the two or more electric motors;
   speed variation calculating sections for calculating the speed variation estimating values for the two or more electric motors in accordance with the detected currents and the current command values for the motors corresponding to the detected currents; and
   a compensatory calculating section for delivering the values that serve to compensate the amplitudes, frequencies and phases of the voltages applied to the two or more electric motors in such a manner that the speed variation estimating values calculated by the speed variation calculating sections become equivalent,
   wherein the compensatory calculating section delivers the values that serve to compensate the amplitudes, frequencies and phases of the voltages applied to the electric motors in such a manner that the phases of the speed variation estimating values calculated by the speed variation calculating sections lead by an amount represented by an equation of $-\pi/4+\tan^{-1}(L\sigma\cdot\omega/r\sigma)$, wherein $\omega$, $L\sigma$ and $r\sigma$ denotes the angular frequency of the speed variation, motor stray inductance of the electric motor and motor resistance, respectively.

4. An electric motor drive system for driving two or more electric motors at variable rotational speeds, comprising:
   current detecting sections for detecting the currents flowing into the two or more electric motors;
   speed variation calculating sections for calculating the speed variation estimating values for the two or more electric motors in accordance with the detected currents and the current command values for the motors corresponding to the detected currents; and
   a compensatory calculating section for delivering the values that serve to compensate the amplitudes, frequencies and phases of the voltages applied to the two or more electric motors in such a manner that the speed variation estimating values calculated by speed variation calculating sections become equivalent,
   wherein each speed variation calculating section calculates the speed variation estimating value proportional to the difference $\Delta I$ between the detected current value of the electric motor and the current command value, on the basis of the motor resistance, the electric resistance of the cable connecting between the power converter and the motor, the stray inductance of the motor and the magnetic flux command value of the motor.

5. An electric motor drive system for driving two or more electric motors at variable rotational speeds, comprising:
   current detecting sections for detecting the currents flowing into the two or more electric motors;
   speed variation calculating sections for calculating the speed variation estimating values for the two or more electric motors in accordance with the detected currents and the current command values for the motors corresponding to the detected currents; and
   a compensatory calculating section for delivering the values that serve to compensate the amplitudes, frequencies and phases of the voltages applied to the two or more electric motors in such a manner that the speed variation estimating values calculated by the speed variation calculating sections become equivalent,
   wherein the electric motor drive system further comprising a speed variation average calculating section for calculating the average of the speed variation estimating values for the two or more electric motors, wherein the compensatory calculating section delivers the values that serve to compensate the amplitudes, frequencies and phases of the voltages applied to the two or more electric motors on the basis of the speed variation estimating values calculated by the speed variation calculating sections and the average of the speed variation estimating values calculated by the speed variation average calculating sections.

6. An electric motor drive system as claimed in claim 5, wherein the compensatory calculating section delivers the values that serve to compensate the amplitudes, frequencies and phases of the voltages applied to the electric motors in such a manner that the phases of the speed variation estimating values calculated by the speed variation calculating sections lead by an amount represented by an equation of $-\pi/4+\tan^{-1}(L\sigma\cdot\omega/r\sigma)$, wherein $\omega$, $L\sigma$ and $r\sigma$ denotes the angular frequency of the speed variation, motor stray inductance of the electric motor and motor resistance, respectively.

7. An electric motor drive system as claimed in claim 5, wherein each speed variation calculating section calculates the speed variation estimating value proportional to the difference $\Delta I$ between the detected current value of the electric motor and the current command value, on the basis of the motor resistance, the electric resistance of the cable connecting between the power converter and the motor, the stray inductance of the motor and the magnetic flux command value of the motor.

* * * * *